United States Patent [19]
Kloster

[11] Patent Number: 5,940,943
[45] Date of Patent: Aug. 24, 1999

[54] DOUBLE CARABINER

[76] Inventor: Daniel R. Kloster, 2508 W. 90th St., Leawood, Kans. 66206

[21] Appl. No.: 09/044,504

[22] Filed: Mar. 19, 1998

[51] Int. Cl.$^6$ .................................................. A44B 13/00
[52] U.S. Cl. ...................... 24/573.5; 24/573.7; 24/598.5
[58] Field of Search .............................. 24/573.5, 573.7, 24/598.5, 599.4, 599.9, 573.1

[56] References Cited

U.S. PATENT DOCUMENTS

| 582,780 | 5/1897 | Eldridge . | |
|---|---|---|---|
| 1,025,666 | 5/1912 | Yeagle | 24/599.4 |
| 1,060,736 | 5/1913 | Bayer . | |
| 1,189,199 | 6/1916 | Hachmann . | |
| 1,219,199 | 3/1917 | Troop . | |
| 1,680,551 | 8/1928 | King | 24/573.5 |
| 1,709,235 | 4/1929 | Shaffer . | |
| 1,749,096 | 3/1930 | Baxter . | |
| 3,621,651 | 11/1971 | Gillespie | 24/573.7 |
| 4,835,823 | 6/1989 | Contat | 24/573.5 |

*Primary Examiner*—Victor N. Sakran
*Attorney, Agent, or Firm*—Shook, Hardy & Bacon

[57] ABSTRACT

A carabiner is provided that has a body which includes a central shank. A first pair of legs protrude laterally from the shank in a first direction and a second pair of legs protrude from the shank in a second direction which is opposite the first direction. Each pair of legs presents distal ends that turn toward one another to define a pair of chambers. The carabiner also has a gate supported between the distal ends of each pair of legs. The gates include a first end connected to the distal end of one of the legs and are pivotal between a closed position with the gate closing off the chamber and an open position allowing access to the chamber.

18 Claims, 1 Drawing Sheet

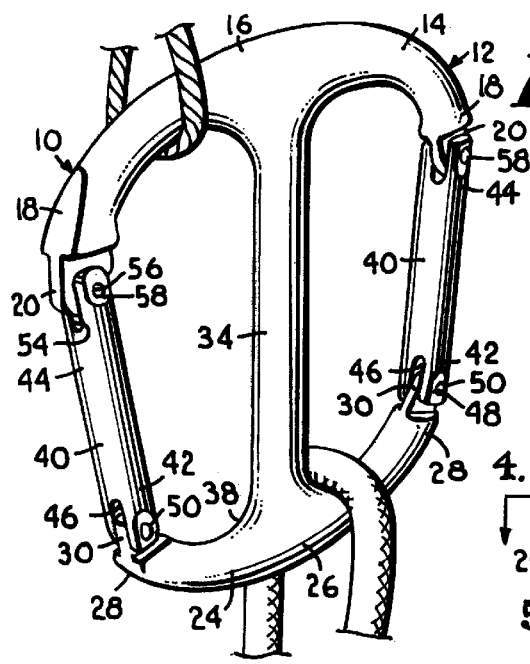
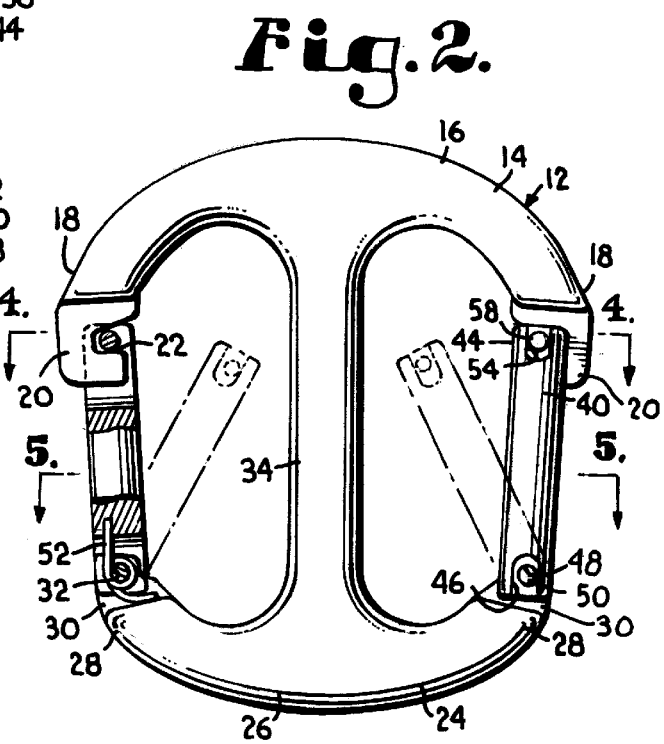
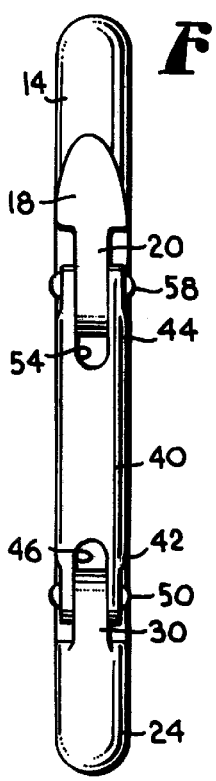
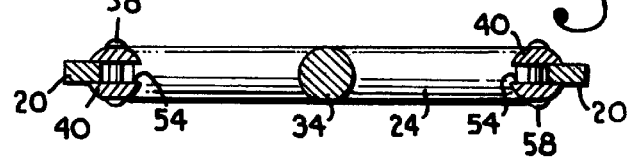
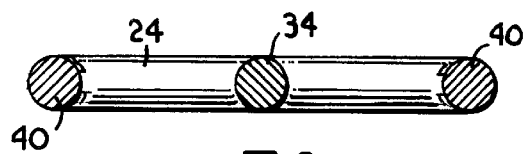

DOUBLE CARABINER

STATEMENT REGARDING FEDERALLY SPONSORED RESEARCH OR DEVELOPMENT

Not Applicable.

CROSS REFERENCE TO RELATED APPLICATIONS

Not Applicable.

BACKGROUND OF THE INVENTION

This invention relates to a device usable in climbing, and more particularly to a carabiner that has two usable chambers.

Rock climbing and rappelling have recently become more popular, as have other so-called "extreme" sports. Rock climbing offers individuals an opportunity to be outdoors and participate in an activity that is both rewarding and challenging, while at the same time being non-destructive to the natural environment. Rock climbing has become so popular that there are now many facilities across the country that allow individuals to climb indoors on artificial rock faces.

Rock climbing involves the challenge of navigating a rock face which is often essentially vertical. At the start of the climb, the climber will determine the path to be taken as the climber ascends the rock face. The climber will generally need to use his or her entire body as that ascent takes place. Beyond the climber's body, a number of pieces of equipment are generally used by the rock climber. This equipment varies from climbing shoes equipped with tough rubber soles, to sewn harnesses, to special climbing rope.

One of the most common pieces of climbing equipment is a carabiner. Carabiners can be used outside the sport of climbing, but are typically within the sport of climbing for a great variety of purposes, and are often specifically designed for climbing. For example, carabiners can be used to secure a belay device to the harness of the climber, and can be used for abseiling and belaying after the climber has reached the top of the climb. Carabiners can also be used to hold other pieces of equipment on the harness of the climber, and to secure the climbing rope to the climber. The carabiner is, therefore, a staple component of a climber's equipment package.

Prior art carabiners have typically been oval, D-shaped or pear-shaped and can be made from aluminum or steel. While steel provides a stronger material, steel carabiners are typically used only for rescue, industrial and institutional applications. Aluminum carabiners are much more common and are lighter and less expensive that steel carabiners. While not as strong as the steel carabiners, aluminum carabiners are well-equipped to handle the loads encountered by the typical rock climber.

Prior art carabiners have a main body and a gate which cooperate to form an enclosure which is used for a variety of purposes as discussed above. The gate of the prior art carabiner is biased towards a closed position. When the climber desires to place a rope, loop, clip or other piece of equipment within the enclosure of the carabiner, the gate may be pivoted inwardly, allowing access to the enclosure. The gate will pivot to a closed position under the influence of a biasing spring. Often the carabiner will be used when the climber is on the face of the rock, and in an awkward position. One problem with prior art carabiners is that they must be properly oriented with respect to the piece of equipment to which they will be attached. The carabiner must be oriented so that the gate faces the piece of equipment. This can be awkward and disadvantageous if the climber is in a position which makes it difficult to so position the carabiner. If nothing else, it requires the climber to be concerned about one additional factor while on the face of the rock.

Further, prior art carabiners have only one usable chamber, formed by the main body and the gate. This limits the functions which can be performed by the carabiner, as well as requiring the carabiner to have a particular orientation when being attached to a piece of equipment.

Therefore, a carabiner is needed which overcomes the above drawbacks and disadvantages of prior art carabiners.

BRIEF SUMMARY OF THE INVENTION

Accordingly, it is an object of the present invention to provide a carabiner which can be accessed from either side thereof.

Another object of the invention is to provide a carabiner which has two usable chambers oriented beside one another.

According to the present invention, the foregoing and other objects are obtained by a carabiner that has a first unshaped crown and a second unshaped crown that are oriented to face one another. An elongated shank is coupled between the first crown and the second crown to form two discrete chambers. Preferably the shank is integrally formed with the first and the second crown. A pair of gates are pivotally coupled to the second crowns. The gates pivot between a closed position in which the free end of the gate abuts the first crown and an open position in which the free end of the gate is moved inwardly towards the shank. When the gate is moved to an open position, the chamber may be accessed by a rope or other piece of equipment. The carabiner therefore has two chambers, divided by the shank, thus allowing access to the carabiner from either side thereof.

Additional objects, advantages, and novel features of the invention will be set forth in part in the description which follows and in part will become apparent to those skilled in the art upon examination of the following, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

In the accompanying drawings which form a part of the specification:

FIG. 1 is a perspective view of a carabiner embodying the principles of the present invention;

FIG. 2 is a front elevation view of the carabiner of FIG. 1, with parts being broken away to show particular details of construction and shown with the gates in a closed position in solid lines and a partially open position in phantom lines;

FIG. 3 is a side elevation view of the carabiner of FIG. 1;

FIG. 4 is a cross-sectional view, taken along line 4—4 of FIG. 2; and

FIG. 5 is a cross-sectional view, taken along line 5—5 of FIG. 2.

DETAILED DESCRIPTION OF THE INVENTION

A carabiner embodying the principals of this invention is broadly designated in the drawings by the reference numeral 10. Carabiner 10 includes a main body 12 which has formed therein a first, generally u-shaped crown 14. Crown 14 has a central section 16 and a pair of terminal ends 18. Each terminal end 18 extends away from central section 16 and, as best seen in FIG. 2, has an area 20 of reduced thickness. Area 20 has formed therein a hook 22, which functions to secure the carabiner in a closed position, as more fully described below.

Main body 12 further has formed therein a second, generally u-shaped crown 24 which has a central section 26 and a pair of terminal ends 28. Terminal ends 28 extend away from central section 26 toward first crown 14. Similarly, terminal ends 18 extend toward second crown 24 so that first crown 14 and second crown 24 are oriented with terminal ends 18 and terminal ends 28 facing one another. Each terminal end 28 has an area 30 of reduced thickness which has a through hole 32 extending therethrough.

Extending from the midpoint of central section 16 to the midpoint of central section 26 is a shank 34. As best seen in FIGS. 1 and 2, shank 34 is preferably formed integrally with first crown 14 and second crown 24. Shank 34 smoothly transitions to first crown 14 with a radiused portion 36, and similarly transitions to second crown 24 with a radiused portion 38. Radiused portions 36 and 38 allow a rope or other climbing apparatus to be held within carabiner 10 while minimizing the risk of binding or catching.

Preferably, main body 12 is made from a forged aluminum alloy. While shown in the figures as having a circular cross-section, other cross-sections can be used, as is well-known within the art. Further, main body 12 is shown configured with shank 34, first crown 14 and second crown 24 forming oppositely facing D-shapes. Generally, D-shaped carabiners are considered the strongest, since the shape moves the rope in a position where the longest side of the carabiner, here adjacent shank 34, is placed under stress. Other shapes, such as oval or pear shaped, could obviously be used and are within the scope of the invention.

Pivotally coupled to terminal ends 28 of second crown 24 are a pair of gates 40 which have a first end 42 and a second end 44. As best seen in FIG. 3, first ends 42 have disposed therein a notch 46 which has a width sufficient to clear area 30 of terminal ends 28. A through hole 48 is located in first end 42, which is aligned with through hole 32 in area 30. Gates 40 are coupled to second crown 24 by placing a rivet 50, or other attaching mechanism, through through holes 32 and 48. As best seen in FIG. 2, gates 40 are allowed to pivot inwardly about rivets 50. As known to those of skill in the art, a spring 52 may be located within gates 40 and coupled to terminal ends 28 to bias the gates in a closed position with first ends 42 abutting terminal ends 18.

As best seen in FIG. 1 and 3, second end 44 of gate 40 has disposed therein a notch 54 similar to notch 46. Notch 54 has a width sufficient to clear area 20 of terminal end 18. Extending through second end 44 of gate 40 is a through hole 56 that accommodates a locking pin 58. Pin 58 extends across second end 44, spanning notch 54. Pin 58 prevents gate 40 from swinging outwardly and fits within hook 22 when gate 40 is in a closed position. Therefore, spring 52 within gate 40 biases the gate to a closed position, with pin 58 held within hook 22. Carabiner 10 may be equipped with a locking collar (not shown) as is known within the art. The locking collar prevents gates 40 from pivoting inwardly unless the collar is properly positioned. Such a locking collar ensures that the climbing rope will not escape from the carabiner once it is placed therewithin and the locking collar is secured.

First crown 14, second crown 24, shank 34 and gates 40 thus cooperate to form a carabiner with two discrete chambers. Each chamber can be accessed by applying an inward force to second ends 44 of gates 40 sufficient to overcome the biasing force of spring 52. This inward force will operate to pivot gate 40 inwardly, creating an opening between gate 40 and terminal ends 18, as shown in phantom lines in FIG. 2. This force can be applied by placing a climbing rope against second end 44 and applying an inward force thereto. Once the rope is within a chamber of carabiner 10, spring 52 within gate 40 will return the gate to a closed position.

As can be seen from the drawings, and the description above, carabiner 10 has two usable chambers, separated by shank 34. Each chamber is selectively accessible by operation of a gate 40. Therefore, it can be seen that a climber need not be concerned about the orientation of carabiner 10 in his or her hand while climbing, because either side of the carabiner may be accessed by the climbing rope or other piece of equipment.

From the foregoing, it will be seen that this invention is one well adapted to obtain all of the ends and objects hereinabove set forth, together with other advantages which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A carabiner comprising:
    a body including a central shank, a first pair of legs protruding laterally from the shank in a first direction, and a second pair of legs protruding laterally from the shank in a second direction generally opposite the first direction, each pair of legs presenting distal ends that are turned toward one another to define a chamber;
    a gate supported between the distal ends of each pair of legs, each gate including a first end connected to the distal end of one of the legs for relative pivotal movement between a closed position closing off the chamber defined by the pair of legs between which the gate is supported and an open position allowing access to the chamber.

2. The carabiner of claim 1, wherein said chambers are D-shaped.

3. The carabiner of claim 1, wherein said chambers are oval shaped.

4. The carabiner of claim 1, wherien said chambers are pear shaped.

5. The carabiner of claim 1, wherein said body is made from an aluminum alloy.

6. The carabiner of claim 5, wherein said shank is generally circular in cross-section.

7. The carabiner of claim 6, wherein said shank is formed integrally with said first pair of legs and said second pair of legs.

8. The carabiner of claim 7, wherein each gate includes a second end distal from said first end, wherein said second end of each of said gates has disposed therein a notch, said gates further comprising a pin extending across said notch, each said pin resting within a hook formed in the distal end of one of the legs.

9. The carabiner of claim 1, further comprising a spring extending within each of said gates, said spring biasing said gate into said closed position.

10. A carabiner for climbing, comprising:

a first crown having a pair of extending first terminal ends;

a second crown having a pair of extending second terminal ends, said first crown and said second crown oriented with said first terminal ends facing said second terminal ends;

a shank coupled between said first crown and said second crown;

a pair of gates, each said gate having a pivotal end and a free end, each said pivotal end being coupled to one of said second terminal ends, each said free end being moveable between a closed position wherein said free end abuts one of said first terminal ends an open position wherein said free end is moved toward said shank;

wherein said first crown and said second crown cooperate with said shank and said gates to form two discrete usable chambers.

11. The carabiner of claim 10, wherein said first crown, said second crown and said shank are made from an aluminum alloy.

12. The carabiner of claim 11, wherein said shank is generally circular in cross section.

13. The carabiner of claim 12, wherein said shank is formed integrally with said first crown and said second crown.

14. The carabiner of claim 13, wherein said free end of each of said gates has disposed therein a notch, said gates further comprising a pin extending across said notch, each said pin resting within a hook formed in each said first terminal end.

15. The carabiner of claim 10, further comprising a spring coupled to each of said second terminal ends and extending within each of said gates, said spring biasing said gate into said closed position.

16. A carabiner, comprising:

a first crown having a pair of extending first terminal ends;

a second crown having a pair of extending second terminal ends, said first crown and said second crown oriented with said first terminal ends facing said second terminal ends;

a shank integrally formed with and extending between said first crown and said second crown;

a pair of gates, each said gate having a pivotal end and a free end, each said pivotal end being coupled to one of said second terminal ends, each said free end being moveable between a closed position wherein said free end abuts one of said first terminal ends an open position wherein said free end is moved toward said shank;

wherein said first crown and said second crown cooperate with said shank and said gates to form two discrete usable chambers.

17. The carabiner of claim 16, wherein said free end of each of said gates has disposed therein a notch, said gates further comprising a pin extending across said notch, each said pin resting within a hook formed in each said first terminal end.

18. The carabiner of claim 17, further comprising a spring coupled to each of said second terminal ends and extending within each of said gates, said spring biasing said gate into said closed position.

* * * * *